United States Patent
Zanichelli (10) Patent No.: US 9,580,313 B2
(45) Date of Patent: Feb. 28, 2017

(54) PROCESS AND A REACTOR FOR OXIDATION OF A HYDROCARBON

(71) Applicant: Casale SA, Lugano (CH)

(72) Inventor: Luca Zanichelli, Grandola ed Uniti (IT)

(73) Assignee: Casale SA (CH)

( * ) Notice: Subject to any disclaimer, the term of this patent is extended or adjusted under 35 U.S.C. 154(b) by 0 days.

(21) Appl. No.: 14/946,086

(22) Filed: Nov. 19, 2015

(65) Prior Publication Data

US 2016/0176710 A1    Jun. 23, 2016

Related U.S. Application Data

(63) Continuation of application No. 13/002,435, filed as application No. PCT/EP2009/057472 on Jun. 16, 2009, now abandoned.

(30) Foreign Application Priority Data

Jul. 4, 2008    (EP) .................................... 08012085

(51) Int. Cl.
| | | |
|---|---|---|
| C01B 3/36 | (2006.01) | |
| B01J 8/02 | (2006.01) | |
| C01B 3/38 | (2006.01) | |
| F23D 14/20 | (2006.01) | |

(52) U.S. Cl.
CPC ............... *C01B 3/363* (2013.01); *B01J 8/025* (2013.01); *B01J 8/0278* (2013.01); *B01J 8/0285* (2013.01); *C01B 3/36* (2013.01); *C01B 3/382* (2013.01); *F23D 14/20* (2013.01); *B01J 2208/00504* (2013.01); *C01B 2203/0244* (2013.01); *C01B 2203/0255* (2013.01); *C01B 2203/1211* (2013.01); *C01B 2203/1241* (2013.01); *C01B 2203/1282* (2013.01)

(58) Field of Classification Search
CPC .......................... F23C 2900/06041; F23C 7/00
USPC .............................................. 431/9, 159, 166
See application file for complete search history.

(56) References Cited

U.S. PATENT DOCUMENTS

| | | | |
|---|---|---|---|
| 2,096,765 | A | 10/1937 | Saha |
| 2,896,914 | A | 7/1959 | Ryan |
| 4,151,709 | A | 5/1979 | Melconian et al. |
| 5,454,712 | A | 10/1995 | Yap |
| 5,492,649 | A | 2/1996 | Christensen |
| 5,508,013 | A | 4/1996 | Kvasnikoff et al. |
| 7,018,435 | B1 | 3/2006 | Wentinck |

(Continued)

OTHER PUBLICATIONS

International Search Report issued in connection with PCT/EP2009/057472.

(Continued)

*Primary Examiner* — Avinash Savani
(74) *Attorney, Agent, or Firm* — Akerman LLP (57) ABSTRACT

A process and related reactor (1) for oxidation of a hydrocarbon feedstock are disclosed, the reactor (1) comprising a vessel (3) and a neck (5) with an axial burner (6) and a tangential gas inlet (2), wherein the neck (5) has a swirling chamber (10) located below said burner (6) and connected to said gas inlet (2), to produce a gas vortex (V) which optimizes the mixing between the gas stream (G) and the oxidizer in said neck (5). Preferably the swirling chamber (10) has an internal surface (12) with a log-spiral profile.

11 Claims, 8 Drawing Sheets

(56) References Cited

U.S. PATENT DOCUMENTS

| | | | |
|---|---|---|---|
| 8,479,668 B2* | 7/2013 | Li | F23D 1/00 |
| | | | 110/104 B |
| 2004/0075084 A1 | 4/2004 | Kramer et al. | |
| 2005/0095186 A1 | 5/2005 | McGee | |
| 2006/0048745 A1 | 3/2006 | Huckelberry et al. | |
| 2007/0029408 A1 | 2/2007 | Hewitt | |
| 2014/0083478 A1* | 3/2014 | Onose | F23G 5/16 |
| | | | 136/205 |
| 2015/0291465 A1* | 10/2015 | Cowles | C03B 5/2356 |
| | | | 65/134.5 |

OTHER PUBLICATIONS

International Preliminary Report on Patentability issued Sep. 22, 2010 in connection with PCT/EP2009/057472.

* cited by examiner

PROCESS AND A REACTOR FOR OXIDATION OF A HYDROCARBON

CROSS-REFERENCE TO RELATED APPLICATIONS

This application is a continuation of U.S. patent application Ser. No. 13/002,435, filed Jan. 3, 2011, which is a national phase of PCT/EP2009/057472, filed Jun. 16, 2009, and claims priority to European Patent Application No. 08012085.0, filed Jul. 4, 2008, the entire contents of which are incorporated herein by reference.

FIELD OF THE INVENTION

The invention relates to a process for oxidation of a hydrocarbon-containing feedstock, and a related reactor. The invention can be applied for example to autothermal reforming, secondary reforming and partial oxidation for production of a syngas or fuel.

PRIOR ART

Partial or total oxidation of a hydrocarbon-containing feedstock (HCF) is carried out in processes such as: the autothermal reforming of coke oven gas or natural gas; the secondary reforming of the process gas coming from a primary reformer, for example for the production of a synthesis gas; the partial oxidation (POX) of a HCF for conversion into a synthesis gas, a fuel or a reducing gas. The oxidizer stream, depending on the application, may be air, $O_2$-enriched air or pure oxygen (usually 95% molar or more), in a reaction chamber of a suitable vessel.

Figure 13:
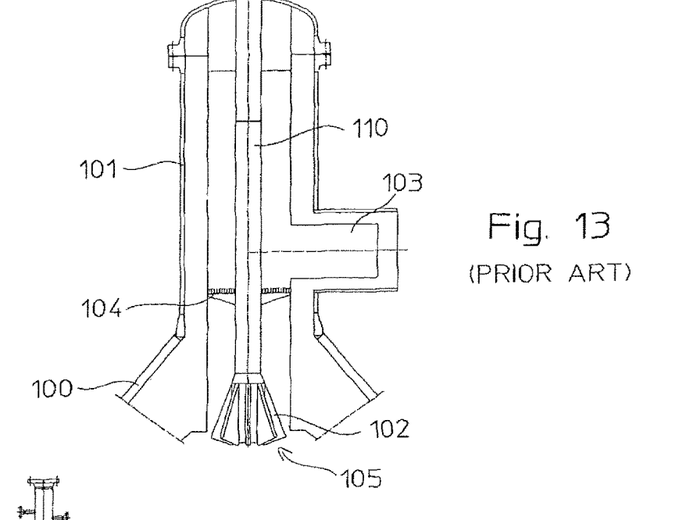
FIGS. 13 and 14 are prior art secondary reformers.

FIG. 13 shows an example of a prior-art air secondary reformer. The reformer has a vessel 100 with a neck 101 where a burner 102 is installed and connected to an air pipe 110. A hydrocarbon-containing feedstock or HCF enters the reformer via refractory-lined transfer line 103, connected to the side of the neck 101. A process gas distributor 104 is installed above the tip 105 of the burner 102, to provide uniform distribution of process gas across the cross section of the vessel neck, and achieve a good mixing with the oxidizer. The burner 102 is installed at the bottom end of the neck 101, so that the combustion takes place in the chamber located at the bottom end of the vessel neck and on top of the catalytic bed (not shown) contained in vessel 100.

Figure 14:
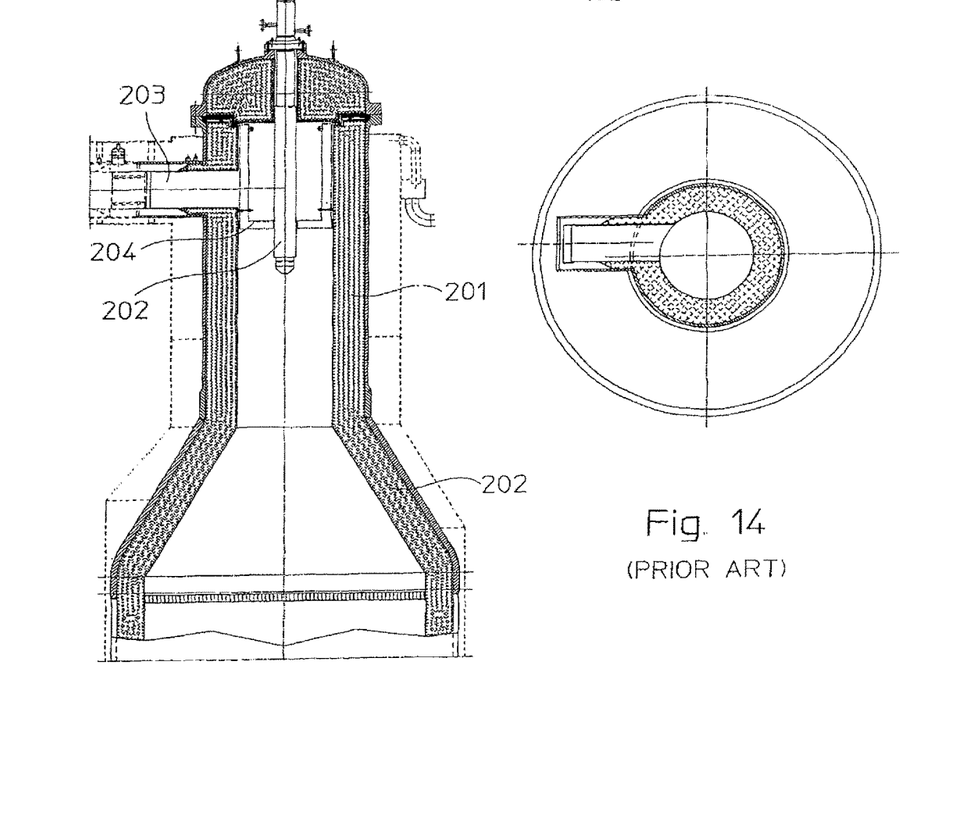

FIG. 14 shows a typical arrangement of oxygen secondary reformers. The reformer comprises a vessel 200, a neck 201, a burner 202, process gas transfer line 203 and gas distributor 204. The burner tip is about at the center of the neck 201, so that the neck itself is used as a combustion chamber.

An autothermal reformer or ATR essentially consist of a reactor where the HCF is subject to partial combustion followed by methane steam reforming and shift conversion over a catalytic bed. The HCF and oxidizer inlets are usually arranged in accordance to FIG. 14, where HCF and steam enter at 203 and oxygen or enriched air enters via the burner 202.

Partial oxidation of a HCF, in the known art, is carried out in a so-called POX gas generator usually comprising a refractory-lined shell defining a suitable combustion chamber and having an axial air (or oxygen) inlet and a lateral HCF inlet.

A drawback of the above-cited prior art is that the HCF inlet stream is subject to a 90°-degree change of direction to enter the combustion chamber. Moreover, due to the asymmetrical inlet, the gas distributor is indispensable is the conventional reformers, to obtain an acceptable mixing between the HCF and the oxidizer stream inside the chamber. The gas distributor however involves a relevant pressure drop. POX gas generator may be realized without the gas distributor, but nevertheless they suffer a relevant pressure drop of the HCF stream since the HCF is forced to flow through the burner itself.

More in detail, the kinetic energy of the HCF is almost completely lost in said change of direction and pressure drop through the gas distributor; hence, the prior art provides that the energy required for the mixing of gas and oxidizer streams is furnished by feeding the oxidizer stream at a pressure well above the operating pressure inside the reformer. The extra pressure energy of the oxidizer stream is converted into kinetic energy, obtaining a high-speed oxidizer stream which promote the mixing with the process gas. This solution however involves relevant pressure drop of oxidizer and, hence, costs and energy consumption for compression A further drawback is that the gas distributor being installed downstream of the HCF inlet, a significant portion of the burner is directly exposed to the hot (around 800° C.) HCF gas, e.g. coming from a primary reformer or pre-heater.

With reference to FIG. 13, it can be seen that the air pipe is directly exposed to the HCF gas stream, usually pre-reformed or pre-heated at a high temperature; an expensive high-alloy pipe is therefore necessary. In oxygen reformers or ATRs (FIG. 14), the body of the burner itself is exposed to the HCF. The gas distributor is also exposed to the hot gas and hence need to be realized with an expensive material, such as an alloy adapted to extreme environment.

Furthermore, the need to maintain the burner tip downstream the gas distributor increases the length of the burner or of the air pipe thereof, which is then exposed to vibrations, especially induced by the gas flow.

As apparent from the above discussion the technical problem and drawback of the prior-art can be summarized as follows:
relevant pressure drop of the HCF;
need of a gas distributor, with the related drawbacks of cost and pressure drop;
need to compress the oxidizer stream, to provide the kinetic energy required for mixing in the combustion chamber;
burner directly exposed to the hot gas flow;
need of an elongated design of the burner, especially in oxygen reformers, exposed to flow-induced vibrations.

The above drawbacks have not yet been solved in the prior art, despite the need of efficient and cost-effective equipment for hydrocarbon reforming, autothermal reforming or partial oxidation, for example for the production of substitute natural gas or production of hydrogen/nitrogen syngas for ammonia synthesis, or other purposes.

SUMMARY OF THE INVENTION

The problem underlying the invention is to provide a new design for reactors herein considered, such as air or oxygen reformers, autothermal reformers and POX gas generators, in order to solve the above listed drawbacks.

The basic idea is to use the inlet kinetic energy of the hydrocarbon-containing feedstock, to generate a suitable swirling motion inside the combustion chamber.

Hence, the above problems are solved with a process for reacting a hydrocarbon-containing feedstock with an oxidizer stream inside a combustion chamber, wherein said oxidizer stream is fed to said combustion chamber in direction of an axis of said chamber, the process being characterized in that a swirling motion around said axis is imparted to said gas stream entering the combustion chamber.

Preferably, the hydrocarbon-containing feedstock is fed to the combustion chamber with a spiral path, more preferably according to a logarithmic spiral, so that a gas vortex with a substantially axial-symmetry of the velocity field is formed inside the combustion chamber.

The hydrocarbon-containing feedstock or HCF, according to the invention, is a gas stream containing gaseous hydrocarbon(s) such as natural gas or methane, or a gaseous flow containing suspended solid combustible such as coal dust or carbon soot, or a gaseous flow comprising dispersed liquid hydrocarbons. The oxidizer stream can be any stream containing oxygen or having oxidizing property, including air, enriched air, pure oxygen, steam or mixtures containing $O_2$, steam and $CO_2$.

As non-limitative examples, the process can be used for: stand-alone autothermal reforming of a raw HCF; secondary reforming of a pre-reformed stream, e.g. coming from a primary reforming step; partial oxidation of a HCF for the production of a syngas.

In accordance, the invention provides a reactor for reacting a hydrocarbon-containing feedstock with an oxidizer stream, the reactor comprising a vessel defining a combustion chamber, at least an axial burner for delivering said oxidizer stream to said combustion chamber, and an inlet for said hydrocarbon-containing feedstock, characterized in that it comprises a swirling chamber connected to said inlet, said chamber being located downstream said burner and upstream said combustion chamber, and being in fluid communication with said burner and combustion chamber, said inlet and swirling chamber being arranged to impart a swirling motion around the axis of the reformer to the hydrocarbon-containing feedstock.

According to a preferred embodiment of the invention, the vessel has a neck delimiting at least part of said combustion chamber; said neck has a portion with enlarged cross section, defining said swirling chamber and connected to the gas inlet.

In one embodiment of the invention, said swirling chamber is located at one end of the neck of the reactor, where the burner is installed; in a further embodiment, there is a gap between combustion chamber and the tip of said burner, so that a pre-chamber is formed downstream the burner and above the swirling chamber. This pre-chamber may serve for the formation of the diffusion flame, in a relatively quite, reduced-swirl environment.

In preferred embodiments, the HCF inlet is tangential, namely the direction of the HCF stream at the inlet of the swirling chamber is tangential to a circumference lying in a plane perpendicular to the axis of the reactor.

According to further aspects of the invention, the swirling chamber is delimited laterally by a side wall having a suitable profile to obtain a vortex around the axis of the neck of the reformer, with no or negligible component of the vector of velocity in the plane normal to said axis. More in detail, according to one aspect of the invention said swirling chamber is delimited laterally by a side wall with a spiral-like internal surface, and the distance of said internal surface from the axis of the reactor progressively decreases from the process gas inlet section of said gas inlet.

In a preferred embodiment said spiral-like surface covers an angle of 360 degrees.

According to a further and preferred aspect of the invention, said spiral-like surface is in accordance with a logarithmic spiral, having the same axis of the reformer. The swirling chamber, in other words, has a log-spiral cross section.

In another and simplified embodiment, the swirling chamber has a circular cross section, in a plane perpendicular to the axis of the neck, i.e. the internal profile of the lateral wall of said chamber is cylindrical rather than following a spiral arrangement.

The invention is applicable to HCF inlets having any cross section, for example rectangular or circular. The gas inlet is connected to a flow line feeding the HCF to said reactor, which is also called transfer line. Preferably, in a reactor connected to a transfer line with a circular cross section, the internal side wall of the swirling chamber has a semi-circular cross section, as will be explained below.

A reactor according to the invention can be, as non-limitative examples, an autothermal reformer, a secondary reformer of a hydrocarbon-reforming equipment, or a partial oxidation gas generator. In the following description, references to a reformer should equally be intended to a POX gas generator or, more generally, to a reactor for oxidizing a HCF.

The reaction can be a catalytic reaction, particularly if the reactor is a secondary reformer or an autothermal reformer. In this case, the vessel contains a catalytic bed and said combustion chamber is defined above said catalytic bed. ATR and secondary reformer are usually catalytic reactors; a POX gas generator can be non-catalytic, if operated at a suitable high temperature.

The advantages of the invention are now discussed.

The HCF stream receives a controlled swirling motion while entering the combustion chamber, due to passage through said swirling chamber, rather than being subject to a highly dissipative change of direction from the (usually horizontal) axis of the transfer line to the (usually vertical) axis of the reactor. This swirling motion allows an efficient mixing between the HCF and the flame formed in the burner, and the oxidizer stream, thus eliminating the need of the gas distributor.

It can be stated that the energy of the process gas is used in an efficient way to improve the mixing with the oxidizer, instead of being wasted through the dissipation and pressure drop across the gas distributor, as in the prior art. A fraction of the energy for the mixing process is found in the gas stream itself, rather than being provided by the oxidizer stream, as in the prior art. Hence, the oxidizer stream can be fed at a lower pressure, reducing the costs related to size and energy consumption of the oxygen or air compressor. On the other hand, for a given velocity of the oxidizer the reformer can be realized with a shorter neck.

Having no gas distributor, it is no longer necessary that the burner tip is below the HCF inlet and, hence, to expose the burner to the process gas. The burner can be shorter and totally removed from the path of the hot gas, for example flushed in the cap of the vessel. The burner is less exposed to flow-induced vibrations and does no longer need expensive materials for extreme environment.

The swirling chamber with a log-spiral cross section is particularly preferred for the following reason. The axis of vortex created in the combustion chamber is coincident with the axis of the reformer and the velocity profiles (axial, radial and tangential) are axis-symmetric. The momentum of the process gas in the direction of the transfer line axis is balanced by the pressure distribution on the wall, resulting in negligible components of the velocity vector (momentum vector) in direction normal to the reactor axis. The oxidizer is injected on the axis of the reactor and from the top of the swirling chamber, forming a diffusion flame in the swirling and combustion chambers, for example in the vessel neck. The oxidizer jet has a momentum vector directed along the axis of the reformer, with radial components being substantially null. The only source of momentum in direction normal to the axis of the reactor, for the diffusion flame, is the entrained process gas. Given the negligible component of momentum normal to the axis, obtained with the shape of the swirling chamber, the flame is not deflected by the lateral injection of the HCF stream. In these conditions, the best mixing between the HCF and the oxidizer is achieved.

In the circular cross-section embodiment, the distribution of pressure is no longer able to balance completely the lateral momentum of the HCF stream from the transfer line, and the axis of the vortex is not coincident with the vertical axis of the vessel. The flame is then slightly deflected by the residual lateral momentum and rotates with the gas, assuming a corkscrew shape. The deflection as well as the rotation increases from the burner nozzle to the tip of the flame, due to the increase in entrained gaseous mass. However the flame deflection can be reduced with a proper design of the reactor, especially the top chamber elements and vessel neck. This embodiment then maintains the main advantages of the invention, with a simplified construction and low cost.

Summarizing, the advantages of the invention are: gas distributor no longer needed; a burner shorter than in the prior art and protected from the gas flow, thus less exposed to flow-induced vibration; increased mixing rate in the neck of the reactor, which means a shorter neck and/or a lower pressure drop for a given mixing length. These and other advantages and features of the invention will be more evident with the following detailed description of a preferred embodiment.

DETAILED DESCRIPTION OF PREFERRED EMBODIMENTS

Figure 1:
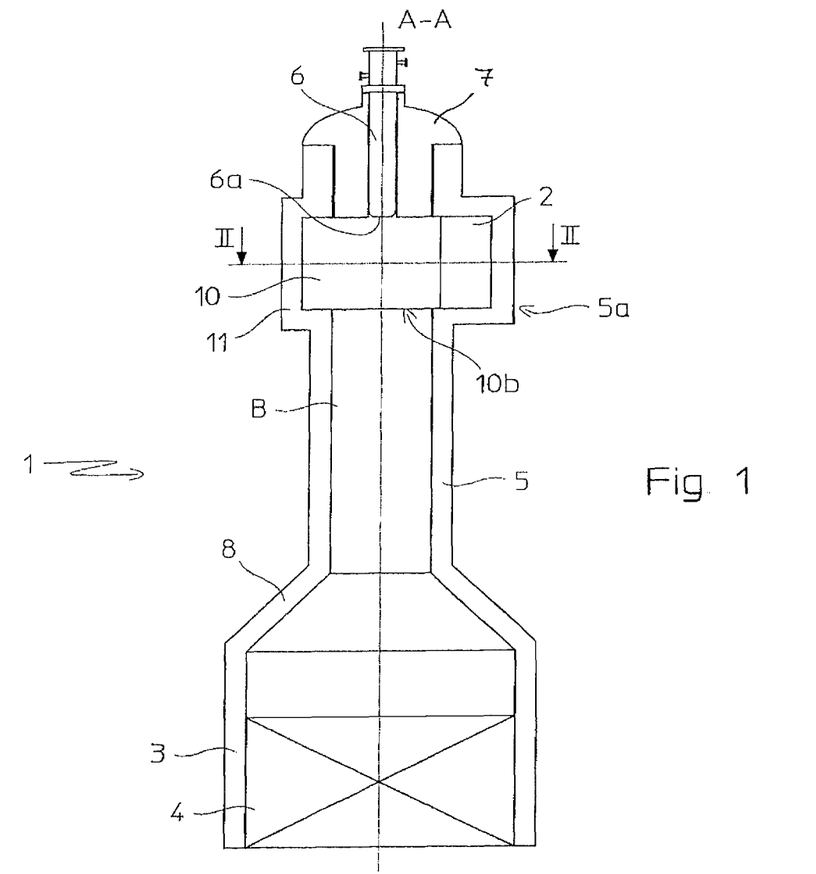
FIG. 1 is a simplified scheme of a reactor according to a first embodiment of the invention.
Figure 2:
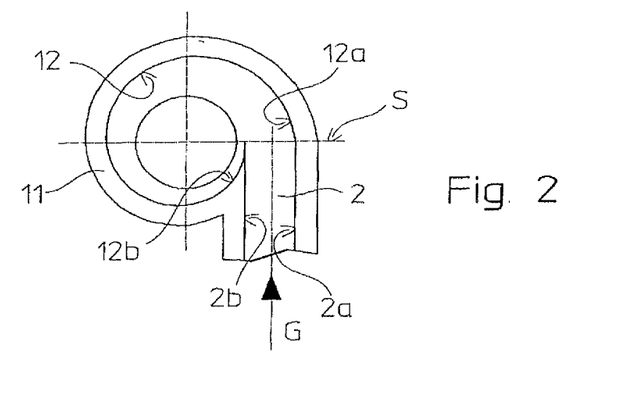
FIG. 2 is a simplified cross section of the swirling chamber of reactor of FIG. 1.

Referring to FIGS. 1-2, a reformer 1 is connected to a gas inlet 2, carrying a hydrocarbon-containing feedstock or HCF stream G. Said HCF stream G can be obtained from primary reforming of a hydrocarbon; an offgas of a coke production plant (coke oven gas) can also form the HCF stream G.

The gas inlet 2 is tangential, as shown, so that the stream G enters the reformer 1 with a direction lying in a plane perpendicular to the vertical axis A-A of the reformer.

The reformer 1 comprises a vessel 3 containing a catalytic bed 4, and having a neck 5 where an oxidizer nozzle or burner 6 is installed. The burner 6, in the shown embodiment, is flushed in a top cover 7 of the neck 5. The oxidizer fed to the burner 6 can be air, oxygen-enriched air, pure oxygen, steam and/or a mixture containing steam, oxygen and carbon dioxide. The neck 5 and vessel 3 are connected by a transition conical wall 8.

The neck 5 comprises a portion 5a with enlarged cross section, defining a swirling chamber 10 connected to the HCF inlet 2. The swirling chamber 10 is located below and in communication with the burner tip 6a, in order to receive the diffusion flame during operation, and has an open bottom 10b in fluid communication with the inside of vessel 3 through the remaining portion of neck 5. It should be noted that there is no gas distributor downstream the gas inlet, so that the open bottom 10b is in direct communication also with the downstream catalytic zone inside vessel 3. The neck portion under the swirling chamber 10 defines a combustion chamber B.

In embodiment of FIGS. 1-2, the swirling chamber 10 is delimited substantially by a side wall 11 with an internal surface 12 following a log-spiral around the same axis A-A. In other words, the cross-section of chamber 10 (FIG. 2) appears as a logarithmic spiral with axis coincident with the axis A-A of the neck 5 and whole reformer 1.

One end 12a of the surface 12 matches a wall 2a of the HCF inlet 2, at the process gas inlet surface S (FIG. 2), while the opposite end 12b of the same surface 12 is tangential to the opposite wall 2b of said inlet 2, in correspondence of the same gas inlet surface S. The log-spiral surface 12, hence, covers an angle of about 360 degrees. Distance of the surface 12 from axis A-A, due to the log-spiral profile, decreases progressively from the end 12a at the gas inlet, towards the end 12b.

Indicating as r the distance from axis A-A, and θ (theta) the angle from the surface S, the cross-section line of surface 12 (FIG. 2) follows an equation of the type:

$$r = a \cdot e^{b\theta}$$

where a and b are preferably chosen to match the walls 2a and 2b of the inlet line 2 at the inlet section S.

Figure 3:
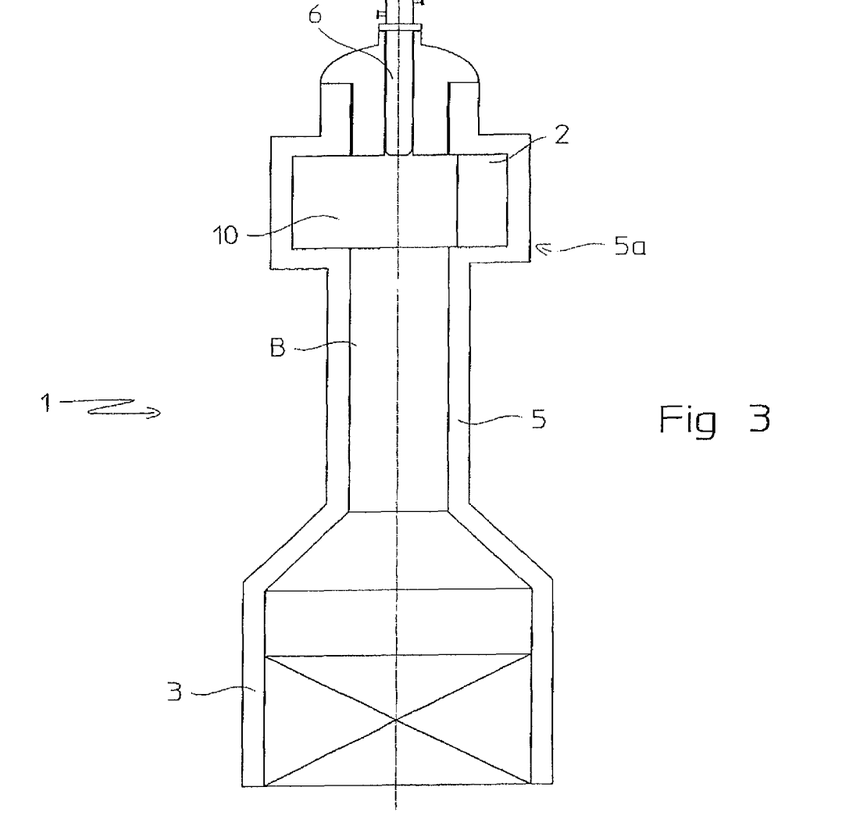
FIG. 3 is a scheme of a reactor according to another embodiment of the invention.
Figure 4:
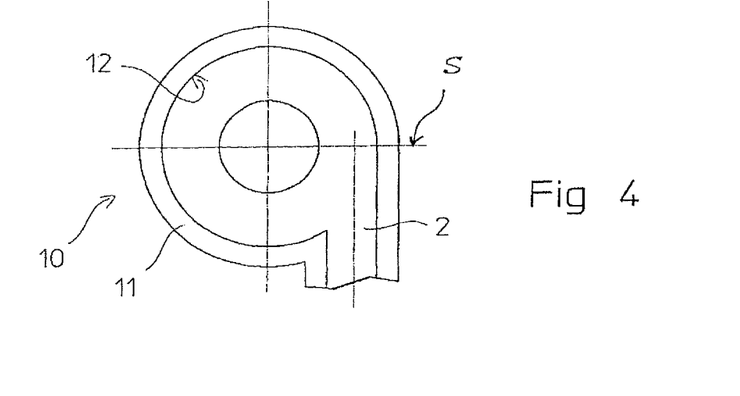
FIG. 4 is a simplified cross section of the swirling chamber of reactor of FIG. 3.

In the simplified embodiment of FIGS. 3 and 4, the surface 12 is cylindrical with the distance from axis A-A remaining constant. Cross-section of surface 12, in this embodiment, is a circular arc; as seen in FIG. 4, the angle covered by the surface 12, starting from the gas inlet surface S, is less than 360 degrees. Preferably said angle is more than 270 degrees and more preferably around 300 degrees.

Figure 5:
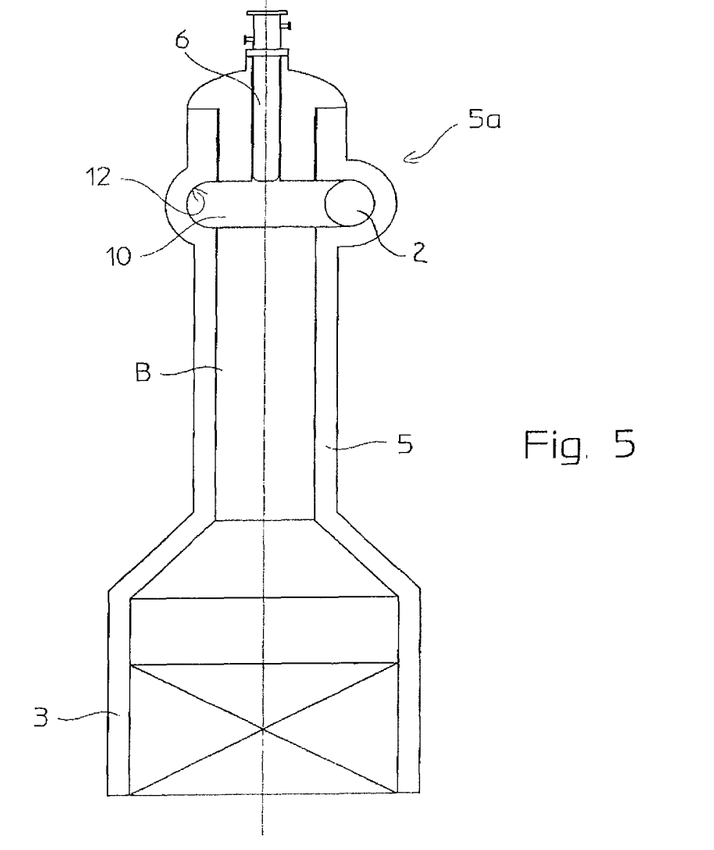
FIG. 5 is a scheme of a reactor according to another embodiment of the invention.
Figure 6:
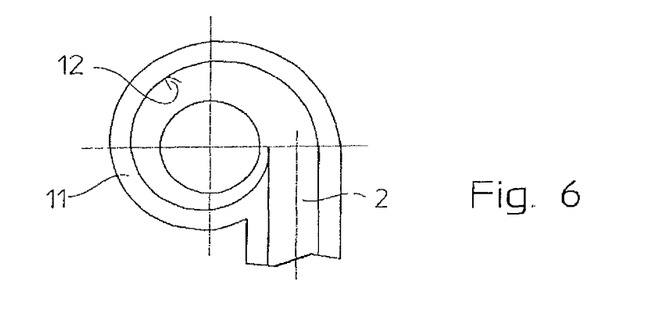
FIG. 6 is a cross section of the swirling chamber of reactor of FIG. 5.

Embodiments of FIGS. 5 to 8 have a HCF inlet 2 with a circular cross section. In this case, the surface 12 has preferably a semi-circular cross section in the plane perpendicular to the inlet direction of gas stream G, as shown in FIG. 5.

The embodiment of the invention where the surface 12 has a semi-circular cross section and a log-spiral path is best for avoiding lateral component of the momentum of the process gas flow, and achieve a substantially axis-symmetric velocity vector field of the gas entering the combustion chamber B.

Figure 7:
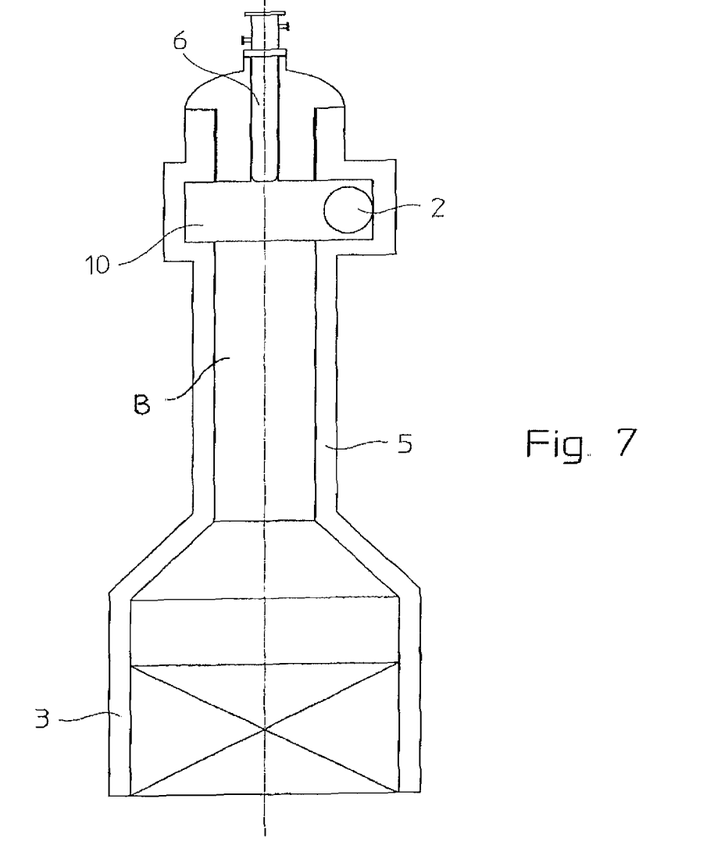
FIG. 7 is a scheme of a further embodiment of the invention.
Figure 8:
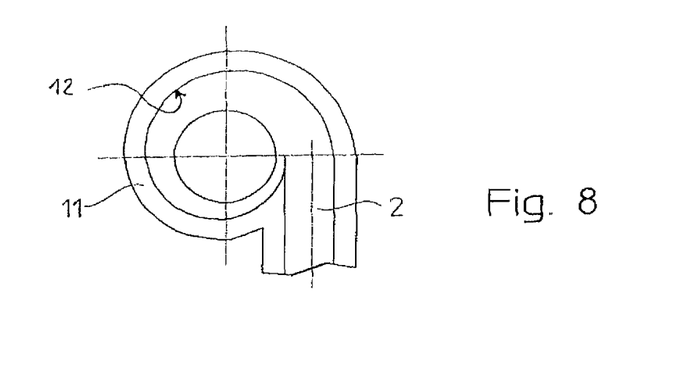
FIG. 8 is a cross section of the swirling chamber of reactor of FIG. 7.

A plane surface 12, however, can also be adopted with the inlet 2 having a circular cross section (FIG. 7). The simplified embodiment of FIGS. 3 and 4 can also be used. In this cases, slight deviation from the axis-symmetric velocity vector field will occur.

Figure 9:
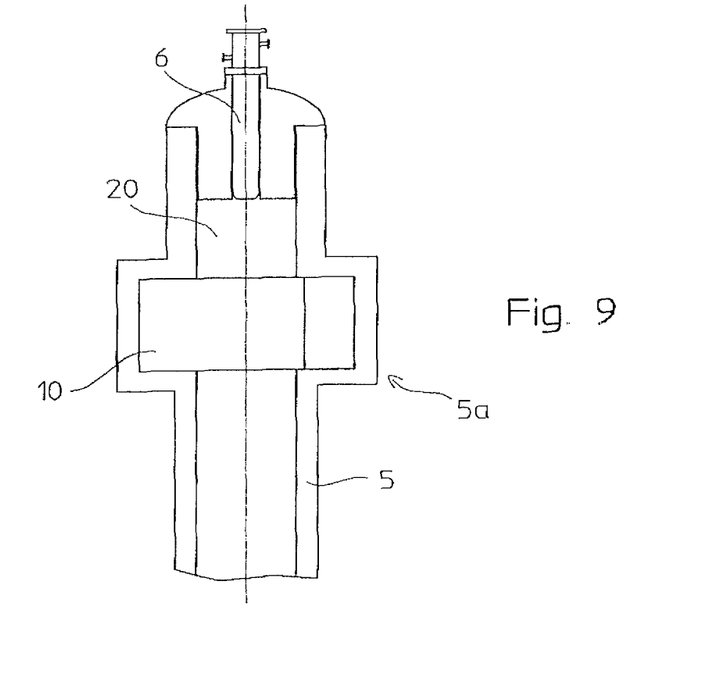
FIG. 9 shows a further variant of the invention, applicable to embodiments of FIGS. 1 to 8.

FIG. 9 shows a further embodiment of the invention, where the swirling chamber 10 is distanced from top of the neck 5, so that there is a gap forming a pre-chamber 20 between the tip of the burner 6, and the chamber 10. Said pre-chamber 20 may be preferred to provide a low-swirling environment for formation of the diffusion flame under burner tip 6a.

Figure 10:
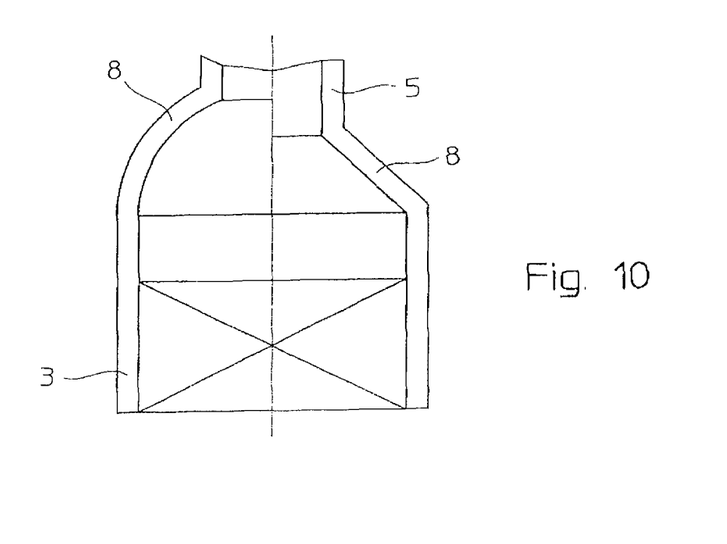
FIGS. 10 and 11 show further examples of the form of the neck of the reactor or the transition connecting the neck to the catalytic zone below.
Figure 11:
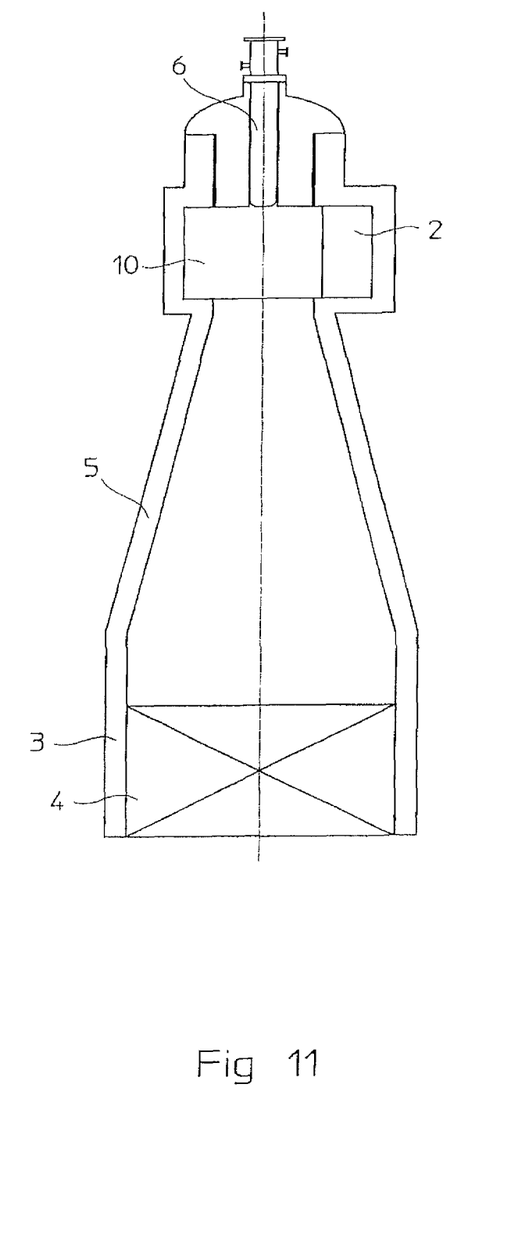

FIG. 10 shows non-limitative examples of the transition connecting the neck 5 with the vessel 3, wherein the transition portion 8 is realized as hemispherical dome (left) or cone (right). FIG. 11 shows a further embodiment of the invention wherein the neck 5 is conical with increasing cross section from top to bottom. The forms of the transition portion 8 of FIG. 10, as well as the conical neck of FIG. 11, are applicable to all embodiments of FIGS. 1 to 9.

According to one of the applications of the invention, the reformer 1 is a secondary reformer of a hydrocarbon reforming equipment. In a further preferred application of the invention, said hydrocarbon reforming equipment is the front-end of an ammonia plant, where the reformed gas produced in the secondary reformer 1 is then subject to known treatments such as shift, carbon dioxide separation and methanation, obtaining a syngas containing nitrogen and hydrogen in a suitable HN ratio for ammonia synthesis.

It should be noted that the above detailed description is referred to a reformer, but the invention is applicable as well to different kinds of reactors, including autothermal reformers, secondary reformers, POX gas generators.

In operation (FIG. 12), the HCF gas stream G enters the swirling chamber 10 where, due to profile of surface 12, a swirling motion is imparted to said gas stream G around axis A-A, thus forming a vortex V with axis coincident with said axis A-A. The vortex V, through the open bottom 10b, extends in the combustion chamber B formed by the neck 5 downstream the gas inlet 2. A diffusion flame F is produced by the oxidizer stream from burner 6 and extends into the combustion chamber B through the swirling chamber 10.

Figure 12:
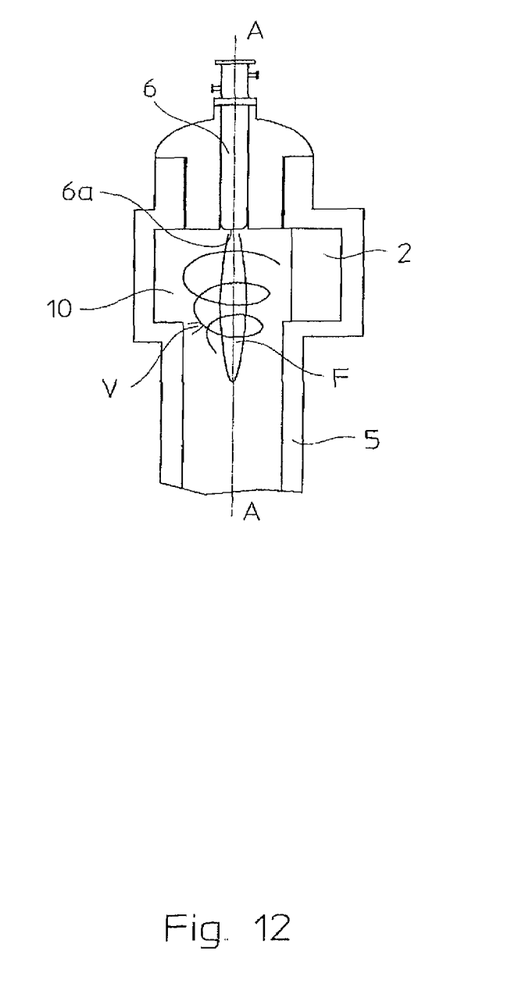
FIG. 12 shows the flow paths and the flame inside the combustion chamber of the reactor of FIG. 1, in operation.

Interaction between the flame F, and oxidizer stream, and the gas vortex V in accordance with the invention, provides a surprisingly effective mixing between the oxidizer and the process gas G. Moreover, the flame F is stable and not deflected from axis A-A, despite the tangential inlet 2 of the gas stream.

In fact, the vortex V produced in the log-spiral swirling chamber has an axis-symmetric velocity vector field with a substantially null component in direction perpendicular to axis A-A. The momentum of the process gas in the direction of the transfer line axis is balanced by the pressure distribution on the surface 12. The vortex V, hence, is unable to transmit any relevant momentum to the flame F, in any direction other than axis A-A. Flame F then maintains the axial direction.

It should be appreciated that the kinetic energy of the HCF stream is not wasted in an uncontrolled deflection from the tangential inlet direction of line 2 to the axis of reformer 1, nor it is dissipated in the passage through a gas distributor. The energy of the HCF stream is actively used to produce the vortex V inside the combustion chamber, where the combination of the oxidizer jet velocity, directed according to axis A-A, and of the swirled velocity field imparted to the HCF stream by chamber 10, increase the strength of the mixing layer between the two streams (gas/oxidizer). Using the same kinetic energy of the entering stream G allows to feed the oxidizer at a lower pressure or to shorten the neck 5 for a given velocity of the oxidizer.

In simplified embodiments of the invention, such as the one of FIGS. 3 and 4, the distribution of pressure on the surface 12 is no longer able to completely balance the lateral momentum of the HCF stream. The axis of vortex V, due to lateral and tangential inlet of line 2, is not coincident with the axis A-A and the there is a slight deflection of flame F, which may assume a corkscrew shape. Said effect of flame deflection can be minimized with a proper design of the chamber 10 and neck 5. The same apply to the embodiment of FIG. 7, due to circular transfer line 2 and plane surface 12. These embodiments, however, are still able to improve the gas/oxidizer mixing compared to the prior art, they do not require the gas distributor as well, and may be chosen for reasons of cost and simplicity.

The invention claimed is:

1. A reactor for reacting a hydrocarbon-containing feedstock with an oxidizer stream, the reactor comprising:
   a vessel defining a combustion chamber,
   at least an axial burner for delivering said oxidizer stream to said combustion chamber,
   an inlet for said hydrocarbon-containing feedstock, and
   a swirling chamber connected to said inlet, wherein said swirling chamber is located downstream of said burner and upstream of said combustion chamber, and is in fluid communication with said burner and combustion chamber,
   wherein said inlet and swirling chamber are arranged to impart a swirling motion around an axis of the reformer to the hydrocarbon-containing feedstock,
   wherein said swirling chamber is delimited laterally by a side wall with a spiral-like internal surface so that the distance of said internal surface from the axis of the reformer progressively decreases from the inlet section of said hydrocarbon-containing feedstock inlet;
   wherein said vessel has a neck delimiting at least part of said combustion chamber, the neck having a portion with enlarged cross section, and wherein said portion delimits the swirling chamber and is connected with the hydrocarbon-containing feedstock inlet.

2. The reactor according to claim 1, wherein said swirling chamber is located at the top of the neck.

3. The reactor according to claim 1, wherein there is a gap between said swirling chamber and the tip of said burner, so that a pre-chamber is formed downstream the burner and above said swirling chamber.

4. The reactor according to claim 1, wherein said spiral-like internal surface of the swirling chamber covers an angle of about 360 degrees.

5. The reactor according to claim 4, wherein said spiral-like internal surface has one end matching an internal wall of the hydrocarbon-containing feedstock inlet, at the inlet section, and an opposite end matching an opposite internal side of said inlet.

6. The reactor according to claim 4, wherein said spiral-like internal surface is a log-spiral surface, having a cross-section profile following a logarithmic spiral.

7. The reactor according to claim 1, wherein the vessel contains a catalytic bed and the combustion chamber is above said catalytic bed.

8. The reactor according to claim 1, said reactor being an autothermal reformer, a secondary reformer of a hydrocarbon-reforming equipment, or a partial oxidation gas generator.

9. A process for reacting a hydrocarbon-containing feedstock with an oxidizer stream inside a combustion chamber of a reactor, wherein said oxidizer stream is fed to said combustion chamber in direction of an axis of said chamber,
  wherein a swirling motion around said axis is imparted to said gas stream entering the combustion chamber;
  wherein a substantially axial-symmetric velocity field is imparted to said hydrocarbon-containing feedstock inside the combustion chamber, by feeding said stream to said combustion chamber via a spiral-like path,
  wherein said reactor is in accordance with claim 1.

10. The process according to claim 9, wherein said spiral-like path follows a logarithmic spiral around said axis of the combustion chamber.

11. The process according to claim 9, wherein said hydrocarbon-containing feedstock is a gas stream containing gaseous hydrocarbon(s) such as natural gas or methane, or a gaseous flow containing suspended solid combustible such as coal dust or carbon soot, or a gaseous flow comprising dispersed liquid hydrocarbons, and the oxidizer stream contains air, enriched air or pure oxygen.

* * * * *